Oct. 25, 1932.  C. J. KRYZANOWSKY  1,883,971
SIGNALING DEVICE
Filed Aug. 10, 1929
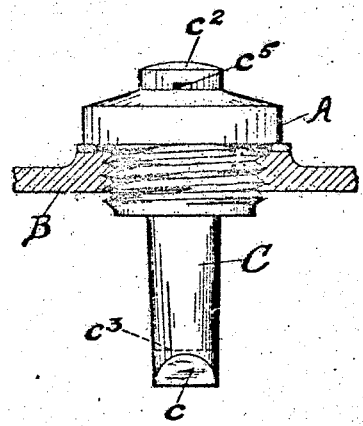
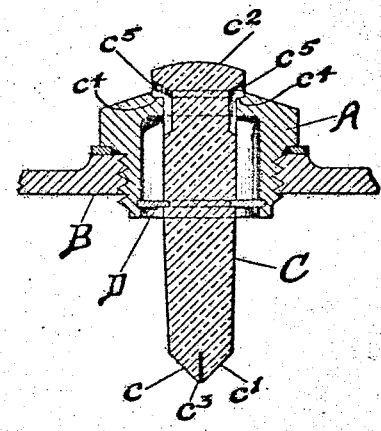
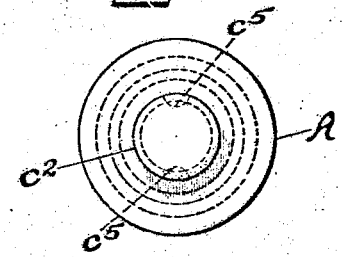
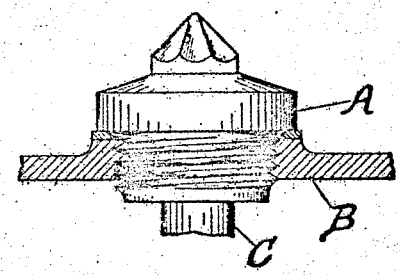
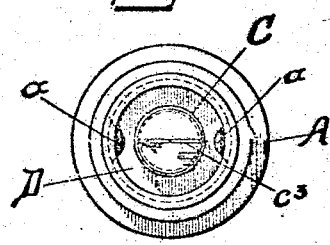
Inventor
Constant J. Kryzanowsky Patented Oct. 25, 1932

1,883,971

UNITED STATES PATENT OFFICE

CONSTANT J. KRYZANOWSKY, OF BALTIMORE, MARYLAND

SIGNALING DEVICE

Application filed August 10, 1929. Serial No. 385,055.

This invention relates to improvements in signaling devices for giving a signal as to the condition of a liquid level, and particularly to such a signaling device suitable for use with tanks, storage batteries, or the like, to allow an observer to see whether or not the fluid or battery solution is up to the proper level or not.

The object of the invention is to provide such a signaling device in a simple and dependable form which will not require any moving parts.

The invention will first be described in connection with the accompanying drawing, and then more particularly pointed out.

In the drawing,—

Figure 1 is an elevation of one embodiment of the invention;

Figure 2 a section of the same on the line 2—2 of Figure 1;

Figure 3 a top plan of the device;

Figure 4 a bottom plan of the same;

Figure 5 a detail view of another embodiment of the invention; and

Figure 6 is a detail perspective view of a further modification.

Referring to Figures 1 to 3 of the drawing, A is a bushing arranged to be screwed into an opening in a container B, in this case shown as part of a storage battery box. The opening may be the normal filling opening. The bushing holds light-transmitting device C which, in the present example, is a rod of transparent material, such as glass, celluloid, bakelite, or quartz. The lower end of the light-transmitting device C is formed as a total reflecting prism, having the refracting surfaces $c$, $c'$ so arranged that light traveling lengthwise of the light-transmitting device will encounter one of said surfaces and be refracted to the other; if the said refracting surfaces are not in contact with liquid, but will not be so refracted if said surfaces are in contact with liquid. The upper end of the light-transmitting device is formed as a light-collecting and concentrating surface, for example, a generally spheroidal or convex surface, as indicated at $c^2$. The length of the light-transmitting device is such that the surfaces $c$, $c^1$, will not be lower than the minimum level of liquid permissible in the box, so as to give a signal as to the presence or absence of the liquid at such level.

In the present embodiment of the invention, there is a color filter between the two refracting surfaces, $c$, $c^1$, so that light refracted from one surface to the other must pass this color filter. In this example the color filter is a sheet of colored transparent material, such, for example, as colored glass $c^3$, which may be inserted in a slot cut in the glass, or other material, of the light-transmitting body, or may be fused or cast with said body in the process of manufacture, when the material of said body is fusible.

The operation of the device thus far described is as follows:

Light from any source, such as sunlight or artificial light, falling on the generally convex upper surface $c^2$ is collected, concentrated and directed downward and passes down in a generally vertical direction through the light-transmitting body. The light falling on surface $c$ is refracted by that surface through the color filter to surface $c^1$ and from there is refracted upward to the convex upper end where it is diffused and appears to the eye of an observer as colored light, thereby giving a signal warning of the absence of liquid at the minimum level. So also the light traveling downward to surface $c^1$ is refracted through the color filter to surface $c$ and then is sent upward as colored light to the convex upper surface $c^2$. Hence, the convex surface will show, to the observer, a colored signal light of the color determined by the color filter $c^3$. That is to say, if the latter is, say, red glass, the convex upper surface $c^2$ will show a red glow. Because of the generally convex portion of the device, the signal light can be seen when the eye of the observer is at one side of the device.

When, however, the liquid in the container has been raised to the level of the surfaces $c$ and $c^1$ so that these surfaces are submerged, the light traveling from above downward is not refracted through the color filter and back to the upper surface but passes downward into the liquid. That is to say, upon the immersion in the liquid of the total refracting prism having the surfaces c and c¹, the prism no longer acts as a total refracting prism. In this condition, no colored light appears at the upper surface. Then the observer knows that the liquid in the container is not below the level predetermined by the location of the prism surfaces.

The light-transmitting body C may be secured in the bushing A in any suitable way. In the present example, said body is provided with an enlarged upper end which fits into a counterbore in the bushing B, the shoulder of the body C being indicated at c⁴. The body C may be locked in place in the bushing by a spring washer D which is snapped into grooves in the body C and bushing B as will be clear from the drawing.

Where it is desired to provide a gas-vent through the device described, suitable channels may be provided in the light-transmitting body, as indicated at c⁵ and the spring washer D may be provided with notches as indicated at d, the latter not being in alignment with the channels c⁵, whereby the danger of fluid loss during the venting of the gas is eliminated or largely reduced.

While the upper surface of the light-transmitting body is advantageously formed as a body of revolution, for example, paraboidal, or spheroidal, it may be a substantially polyhedral surface, that is to say, it may be formed with a plurality of facets, the essential feature being that it is larger in diameter than the body C in order that it will collect a large amount of light and concentrate it in the body C. One form of a device having such a polyhedral surface is shown, in Figures 4 and 5. In this example the upper end of the light-transmitting body is pyramidal. In all cases the purpose is to provide an upper surface for the said body C such that light coming from various directions to said surface will be collected, concentrated and refracted in a downward direction to the prism, while light coming in an upward direction from the prism will be refracted in a plurality of directions by the upper end of the said body C, so that it may be seen readily by the observer from various positions of the observer, thereby avoiding the disadvantage which would exist if the returning light were visible only when the eye of the observer is in one pre-determined position relative to the upper end of the said body C.

While the invention is particularly adapted for use with storage batteries, and as shown, serves as a closure for the filling opening as well as a gage to indicate when the storage battery requires the addition of water to the solution, it will be understood that the gage may also be employed with other containers of liquid to give a signal when the liquid level has fallen below the level predetermined by the location of the lower end of the light-transmitting body in the container.

In Figure 6 is shown another embodiment of the invention in which the lower end of the light-transmitting body is coned and has a cylindrical plug x of colored transparent material, such as colored glass, located at the central axis of the coned portion. The slope of the cone is such that light will be refracted through the central color filter, when the surface of the cone is not immersed in liquid, and will then be refracted to the convex surface. When the coned surface is immersed in the liquid, the light will pass into the liquid, and hence will not return to the said convex surface, which will remain dark.

What I claim is:

1. In a signaling device of the class described, the combination, with means for transmitting light in a direction transverse to the liquid level, of a prism having reflecting surfaces arranged to be wetted by the liquid upon the arrival of the liquid level at a predetermined height, each reflecting surface being arranged to receive rays of light reflected from the other reflecting surface, said prism also having a color filter through which will pass the light rays going from one reflecting surface to the other, said prism being located so as to receive the light from the light-transmitting means and to return it thereto when not wetted by the liquid.

2. A device for use in giving a signal as to the condition of a liquid level comprising an elongated light-transmitting body of transparent material having one end arranged to be located in the path of the liquid whose level is to be determined, said end being formed with sloping surfaces at such an angle to each other as to form a double reflecting prism, and having a color filter so located as to be in the path of rays passing between said surfaces.

3. A device for use in giving a signal as to the condition of a liquid level, comprising an elongated light-transmitting body of transparent material having one end formed as a light-collecting and concentrating portion whose shape is generally convex and having its other end formed as a prism with at least two reflecting surfaces arranged to reflect light from one surface to the other, said prism having a color filter located between the said surfaces, and in the path of rays passing from one surface to the other.

4. In a signaling device of the class described, a bushing arranged to be placed in an opening in the container of the liquid whose level is to be gaged, of a light-transmitting body of transparent material secured in the bushing and having gas-passages to permit the escape of gas, said body having inclined surfaces arranged to form a prism, said surfaces being arranged to contact with the liquid on the arrival of the latter at a predetermined height, and a color filter arranged between two of the prism surfaces.

5. A liquid limit level gauge comprising an elongated upright light-transmitting body having light-reflecting faces at its lower end adapted to totally reflect light, transmitted downwardly through said body, laterally and then upwardly, and embodying a colored medium in the path of said rays adapted to absorb certain of the rays of white light.

6. A liquid limit level gauge comprising an elongated upright light-transmitting body terminating at its lower end in a colored tip, said tip having faces arranged to totally reflect light, transmitted downwardly through said body, laterally and then upwardly.

7. A liquid limit level gauge comprising an elongated upright light-transmitting body terminating at its lower end in an integral colored tip, said tip having faces arranged to totally reflect light, transmitted downwardly through said body, laterally and then upwardly.

8. A liquid limit level gauge comprising an elongated upright light-transmitting body having a conical lower end adapted to totally reflect light, transmitted downwardly through said body, laterally and then upwardly, and embodying a colored medium in the path of said rays adapted to absorb certain of the rays of white light.

In testimony whereof, I have hereunto set my hand.

CONSTANT J. KRYZANOWSKY.